July 1, 1941.  J. J. ROOT  2,247,966

ELECTRIC IMPULSE MOTOR

Filed May 4, 1940   2 Sheets-Sheet 1

INVENTOR
John J. Root
by Seymour Earle Nichols
ATTORNEYS

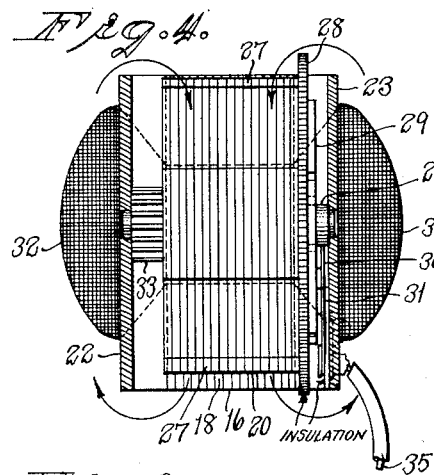
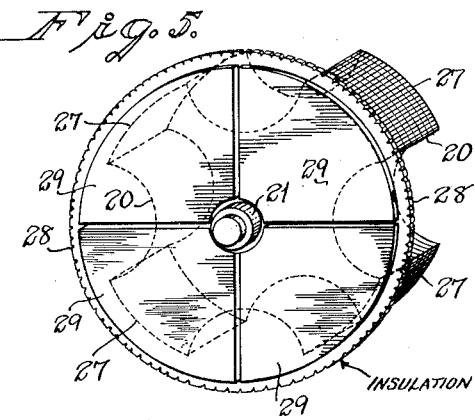
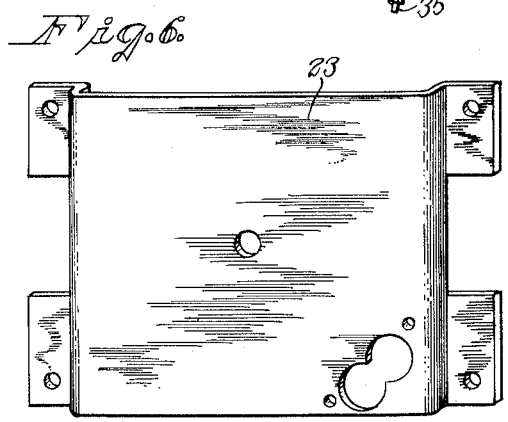
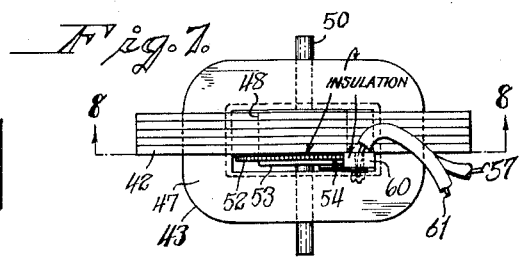
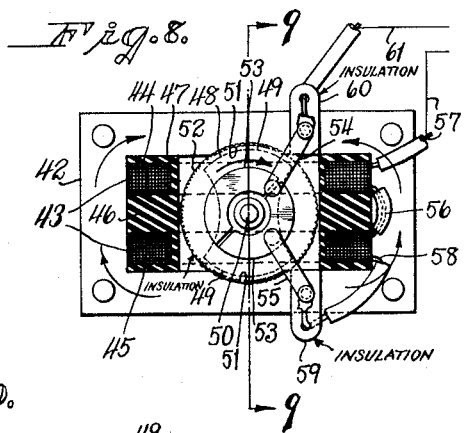
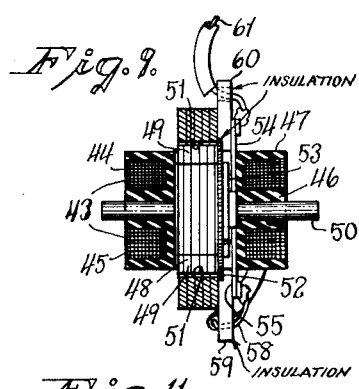
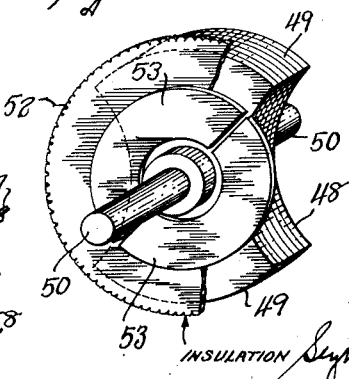
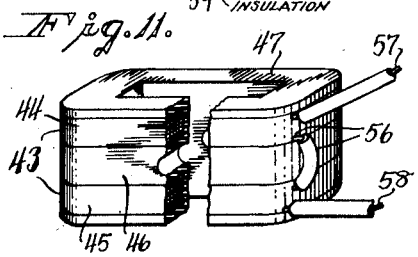
INVENTOR
John J. Root
ATTORNEYS Patented July 1, 1941

2,247,966

UNITED STATES PATENT OFFICE 2,247,966

ELECTRIC IMPULSE MOTOR

John J. Root, Dobbs Ferry, N. Y.

Application May 4, 1940, Serial No. 333,288

9 Claims. (Cl. 172—36)

The present invention relates to improvements in electric motors of the fractional horsepower type, and more particularly to electric impulse-motors of the type in which the current supplied to the energizing-coil is interrupted by a commutator or other suitable breaker driven by the rotor.

One of the objects of the present invention is to provide a superior electric motor of the impulse type and characterized by compactness and superior efficiency.

Another object of the present invention is to provide a superior electric motor of the class described in which the parts are so constructed and arranged as to provide for the direct magnetization of the rotor by an energizing-coil which also serves to energize the stator.

A further object of the present invention is to provide a superior electric impulse-motor in which the energizing-coil also acts to suppress sparking of the breaker controlling the current-feed to the energizing-coil.

Still another object of the present invention is to provide a superior electric impulse-motor which will function efficiently on either A. C. or D. C.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 4 is a transverse sectional view taken on the line 4—4 of Fig. 1;

Fig. 5 is a perspective view of the rotor-unit, detached;

Fig. 6 is a perspective view of one of the coupling-bridges, detached;

Fig. 7 is a top or plan view of another form of electric impulse-motor embodying the present invention;

Fig. 8 is a sectional view taken on the line 8—8 of Fig. 7;

Fig. 9 is a transverse sectional view taken on the line 9—9 of Fig. 8;

Fig. 10 is a perspective view of the rotor-unit of the motor-structure of Figs. 7, 8 and 9; and Fig. 11 is a broken perspective view of the energizing-coil of the motor-structure of Figs. 7, 8 and 9.

Figure 1:
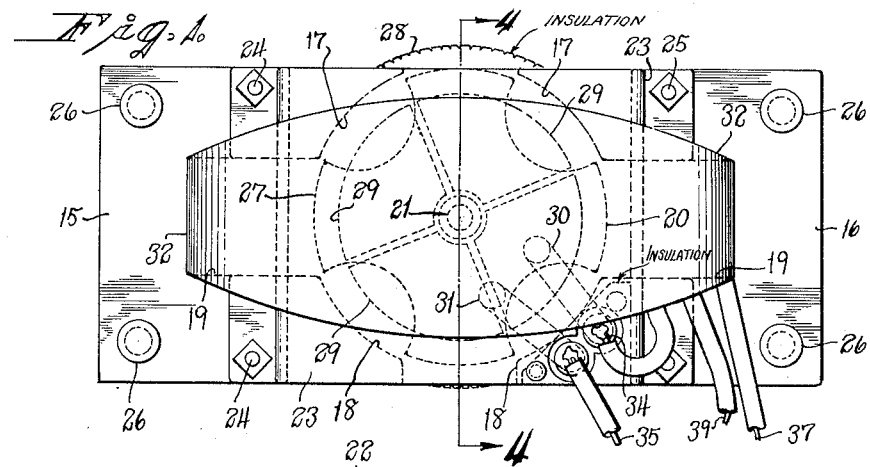
Fig. 1 is a view in side elevation of one form of an electric impulse-motor embodying the present invention.

The structure of Figs. 1 to 6 inclusive

The electric impulse-motor shown in the figures referred to includes a stator which comprises two spaced-apart oppositely-facing stator pole-pieces 15 and 16 of U-shaped form. The said pole-pieces are preferably formed of a group of superimposed substantially U-shape laminations. The material from which the pole-pieces 15 and 16 are formed may be of any suitable magnetic material such, for instance, as soft iron or silicon steel.

Each of the pole-pieces 15 and 16 above referred to includes two spaced-apart inwardly-extending pole-salients 17 and 18 respectively located on opposite sides of a notch 19, one of which is formed in each of the pole-pieces 15 and 16 in such manner as to open inwardly toward the similar notch in the complemental pole-piece. The inner face of the respective pole-salients 17 and 18 of each of the pole-pieces 15 and 16 is of arcuate or cylindrically-contoured form for substantial conformity to the periphery of a rotor 20.

The rotor 20 above referred to is provided with a shaft 21 and rotates in the plane of the pole-pieces 15 and 16. The opposite ends of the shaft 21 of the rotor 20 respectively bear in suitable bearing-openings in coupling-bridges 22 and 23 preferably formed of non-magnetic material and respectively located on the opposite sides of the pole-pieces 15 and 16 and the rotor 20. At their ends adjacent the pole-piece 15, the two coupling-bridges 22 and 23 are clamped to the opposite faces respectively of the said pole-piece by any suitable means such, for instance, as bolts 24. The said bolts 24 extend transversely through the pole-pieces 15 and serve not only to hold the adjacent ends of the coupling-bridges 22 and 23 in place but also serve to clamp the laminations of the pole-piece 15 together.

Similarly, the ends of the coupling-bridges 22 and 23 adjacent the complemental pole-piece 16 are coupled to the said pole-piece by any suitable means such, for instance, as bolts 25. The said bolts 25 extend through the adjacent portions of the respective coupling-bridges 22 and 23 and transversely through the pole-piece 16 so as to not only serve to clamp the said coupling-bridges to the said pole-piece but also the clamp together the various laminations of the said pole-piece.

Preferably and as shown, each of the complemental U-shaped pole-pieces 15 and 16 is provided in each of its outer corners with suitable fastening means such as rivets 26 serving to clamp the laminations sufficiently tightly together to obviate vibration which might otherwise occur as an incident to the driving of the motor by an alternating current.

The rotor 20 like the pole-pieces 15 and 16 is preferably formed of superimposed laminations of magnetic material preferably having low hysteresis properties so as to readily respond to magnetic flux generated by an alternating current. The rotor 20 is formed with an annular series of equidistant substantially-radially-projecting pole-salients 27, each of which has its arcuate periphery shaped concentrically with respect to the shaft 21 of the rotor and also concentrically with respect to the arc of the inner faces of the pole-salients 17 and 18 of the respective pole-pieces 15 and 16, as is especially well apparent in Figs. 1 and 3 of the drawings.

On one of its faces the rotor 20 has rigidly attached to it a starting-wheel 28 preferably formed of insulating material and having a serrated periphery for convenient non-slip engagement by the finger of a user when it is desired to start the rotor 20 in motion.

Secured in turn to the outer face of the insulating starting-wheel 28 is a concentric series of wedge-shaped contact-plates 29 which, in the particular instance shown, are four in number. The contact-plates 29 are separated from each other by a relatively-narrow radial gap, and are preferably formed of copper or other high electro-conductive material.

Secured to the inner face of the coupling-bridge 23 and insulated therefrom and from each other, are brushes 30 and 31 formed of spring metal such, for instance, as bronze, and extending into sliding electrical engagement with the outer face of whichever of the contact-plates 29 happens to be in registration therewith at any given time. The said brushes 30 and 31 are turnable about their point of mounting to the coupling-bridge 23 against adequate frictional restraint so as to have their outer ends adjustable for movement into greater or lesser separation with respect to each other.

Encircling the rotor 20, the starting-wheel 28, the contact-plates 29, as well as the coupling-bridges 22 and 23 and the shaft 21, is an energizing-coil 32 having portions fitting within the respective inwardly-opening notches 19 in the pole-pieces 15 and 16.

As thus arranged, the energizing-coil 32 extends around the rotor 20 in a plane substantially perpendicular with respect to the plane of rotation of the said rotor. In other words, the shaft 21 and hence the axis of rotation of the rotor 20 extends substantially diametrically of the energizing-coil 32. This construction and arrangement of parts produces favorable results as will be more fully hereinafter made apparent.

Figure 2:
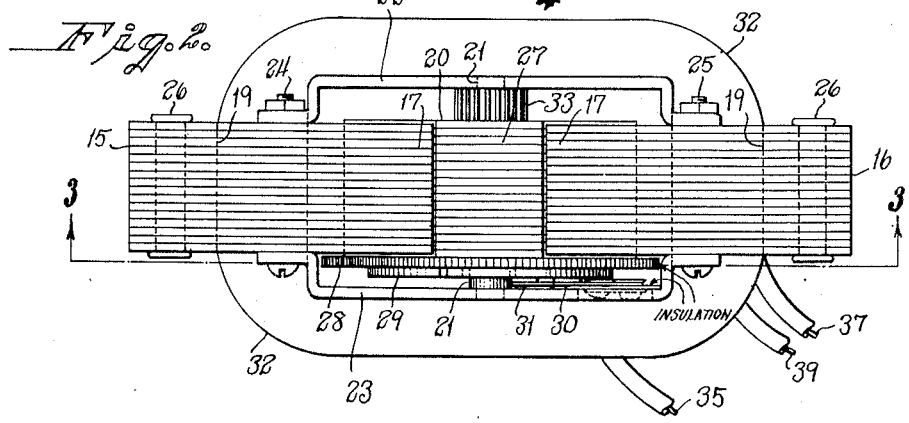
Fig. 2 is a top or plan view thereof.

Any suitable means may be employed for taking-off the power from the rotor 20 such, for instance, as by mounting a drive-pinion such as 33 upon the shaft 21, as is especially well shown in Figs. 2 and 4. A gear-wheel or the like (not shown) may be meshed into the driving-pinion 33 and connected to any device which it is desired to drive.

Figure 3:
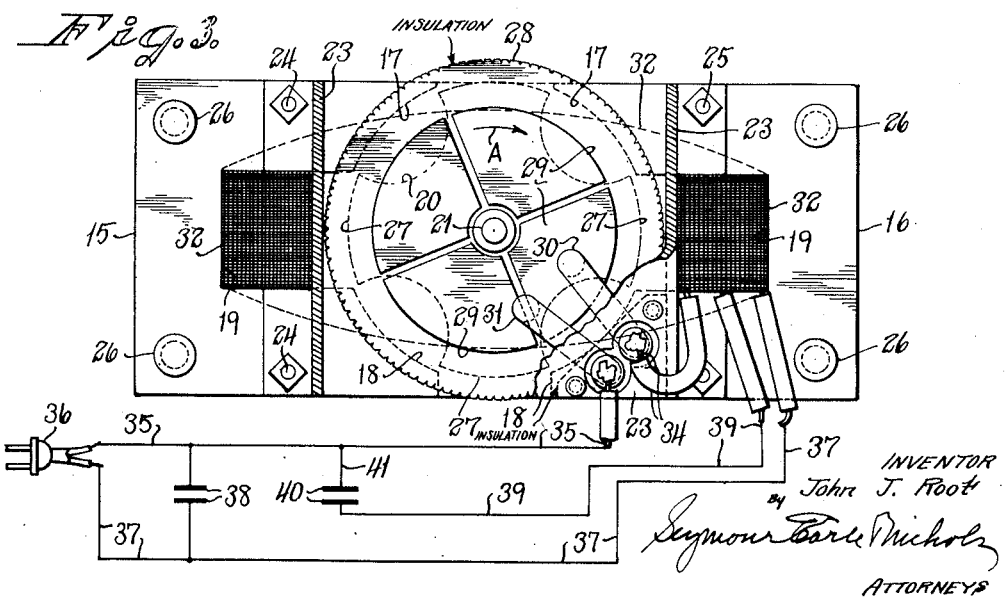
Fig. 3 is a longitudinal sectional view taken on the line 3—3 of Fig. 2 with a portion of one of the coupling-bridges shown in elevation, and also showing one form of electric circuit suitable for the motor.

The electric circuit for the impulse-motor above described may assume a variety of forms, but preferably the circuit is of the character indicated particularly well in Fig. 3 of the drawings. In the particular circuit illustrated, the inner terminal of the energizing-coil 32 is connected by a wire 34 to the brush 30. The complemental brush 31 is connected by a wire 35 to one prong of a conventional electric plug 36. The opposite prong of the plug 36 is connected by a wire 37 to the outer terminal of the energizing-coil 32, as is shown in Fig. 3. Preferably a condenser 38 is connected between the two wires 35 and 37 before referred to, to aid in the counteraction of any tendency for sparking between the revolving contact-plates 29 and the brushes 30 and 31. Preferably also the energizing-coil 32 is tapped intermediate its inner and outer terminals by a wire 39 which connects to one side of a second condenser 40 having its other side connected to the wire 35 by a wire 41.

The plug 36 may be plugged into a suitable source of either direct current or of alternating current so that current may (at intervals hereinafter described) flow through the energizing-coil 32 with the result that said energizing-coil will directly magnetize not only the pole-pieces 15 and 16 of the stator structure but also the rotor 20, since the said rotor is so arranged that the flux flowing within the said energizing-coil in a direction substantially at right angles to its plane will pass substantially diametrically through the said rotor.

For purposes of convenience of description, let it be assumed that the motor-structure is supplied with either direct or alternating current of proper voltage, etc., and that the rotor 20 has been manually started by means of its starting-wheel 28.

Under the above conditions, each time a given one of the contact-plates 29 carried by the rotor 20 moves into engagement with both of the brushes 30 and 31, the energizing-coil 32 will be supplied with current and the said rotor will be turned in the direction of the arrow A (Fig. 3). As soon, however, as the rotor 20 moves into a position wherein one of the said brushes rests upon one contact-plate 29 and the other brush rests upon another thereof, no current will flow through the energizing-coil 32 until such time as both brushes 30 and 31 bear upon a single contact-plate as just referred to. The contact-plates 29 act in conjunction with the brushes 30 and 31 to provide a make-and-break device for the circuit of the energizing-coil 32, so that when the pole-salients of the rotor are brought sufficiently into alignment for best operating conditions with the pole-salients of the stator, the magnetic flux will be automatically shut off until the rotor has progressed sufficiently by its own momentum to be in position to be pulled around another step by the coaction of its pole-salients 27 respectively with the next succeeding ones of the pole-salients of the stator structure.

Let it further be assumed that at a given instant each of the pole-salients 17—17 of the respective pole-pieces 15 and 16 have a north polarity imparted to them. Under these conditions, the pole-salient 18 of each of the said pole-pieces 15 and 16 will have a south polarity imparted to them. Also under these conditions the energizing-coil 32 will directly impart a south polarity to the upper pole-salient 27 of the rotor 20 which is adjacent the north polarity pole-salients 17—17, and a north polarity to the lower pole-salient of the rotor which is adjacent the south polarity pole-salients 18—18, all as is indicated in Fig. 3. The flux-flow under the conditions just described is indicated schematically by the arrows in Fig. 4.

*The structure of Figs. 7 to 11 inclusive*

In Figs. 7 to 11 inclusive is illustrated a slightly different form of motor than that shown in Figs.

1 to 6 inclusive, though both forms of impulse-motors have fundamentally the same novel characteristics.

In the structure of the figures just above referred to, a substantially-rectangular ring-like stator pole-piece 42 is employed. The said pole-piece comprises, in effect, two integral opposed U-shaped portions and is preferably laminated and formed of readily permeable magnetic material. Mounted within the ring-like pole-piece 42 is an energizing-coil generally designated by the reference character 43, and comprising two coil-sections 44 and 45 axially displaced with respect to each other and separated by a central annular radially-extending rib 46 of a spool 47 preferably formed of non-magnetic material. The said spool 47 as well as the energizing-coil 43, has its axis extending perpendicularly with respect to the axis of the aperture through the ring-like pole-piece 42, and in turn has located within its interior a two-poled rotor 48 mounted for rotation in a plane substantially parallel with the plane of the stator pole-piece 42.

The rotor 48 has two diametrically-opposite pole-salients 49—49, each having a cylindrically-contoured outer face extending concentrically with respect to the shaft 50 upon which the rotor 48 is mounted. Midway of its length, the ring-like pole-piece 42 is formed with two inwardly-facing arcuate pole-faces 51—51 respectively located on opposite sides of the rotor 48 and extending concentrically with respect thereto.

The shaft 50 of the rotor 48 extends at each of its respective opposite ends radially through the annular rib 46 of the spool 47 and bears therein on the respective opposite sides of the said spool.

Secured to one face of the laminated rotor 48 is a starting-wheel 52 preferably formed of insulating material and carrying upon its outer face two concentric substantially semicircular contact-plates 53—53 spaced from each other by narrow radial gaps, as is shown particularly well in Fig. 10. Extending radially inwardly from diametrically-opposite points on the stator pole-piece 42 are two similar brushes 54 and 55 adapted to bear at their inner ends against the outer faces of the contact-plates 53—53.

The two coil-sections 44 and 45 of the energizing-coil 43 are interconnected at 56 (Fig. 8) so that each of the said coil-sections has current flowing through it in the same direction as the other section. One terminal of the energizing-coil 43 is connected by a wire 57 to any suitable source of energizing current, and the complemental terminal of the said energizing-coil is connected by a wire 58 to the brush 55 at a point where the same is mounted upon an insulating-plate 59 secured to the adjacent portion of the pole-piece 42. The complemental brush 54 is mounted upon an insulating-plate 60 secured to the adjacent face of the pole-piece 42, as is shown especially well in Fig. 8. Connected to the brush 54 and leading to a source of suitable energizing current is a wire 61.

When the wires 57 and 61 are connected to a suitable source of energizing current and the rotor 48 is turned by means of its starting-wheel 52 so as to bring one of the contact-plates 53—53 into engagement with both of the brushes 54 and 55, the energizing-coil 43 will be activated and cause a flow of magnetic flux in the pole-piece 42, as well as directly in the rotor 48.

For the purposes of description, the magnetic flux may be viewed as flowing in the direction indicated by the arrows imposed upon Fig. 8.

If desired, suitable condensers may be connected into the system in a manner such, for instance, as is indicated in the structure of Figs. 1 to 6 inclusive.

It will be appreciated from the foregoing that by reason of the rotation of the contact-plates 53—53 with the rotor, the said rotor will have impulses imparted to it to maintain it in continuous rotation as long as the current supply is maintained.

General considerations

The electric impulse-motor of Figs. 1 to 6 inclusive as well as the impulse-motor of Figs. 7 to 11 inclusive are both characterized by a construction and arrangement of parts wherein a rotor has its axis of rotation extending substantially diametrically of an energizing-coil. From this fact it follows that the diameter of the rotor is so arranged as to be substantially parallel with the flux flowing through the hollow interior of the energizing-coil to be thus directly magnetized thereby at the same time that the pole-piece or pole-pieces receive magnetic flux generated mainly upon the exterior of the energizing-coil.

By means of the construction and arrangement of parts described, it is possible to produce an electric impulse-motor of minimum lateral dimensions when the resultant torque is taken into account.

Furthermore, the arrangement of the rotor-axis with respect to the energizing-coil greatly increases the efficiency of the structure over that obtainable with prior designs.

By locating the coacting portions of the contact-plates and the brushes within an energizing-coil, the flux from the latter has a marked suppressing effect upon any sparking which might be initiated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An electric impulse-motor including in combination: a normally-stationary energizing-coil; a rotor encircled by and mounted for rotation within the said energizing-coil with its axis of rotation arranged substantially-perpendicularly with respect to the axis of the said energizing-coil; a stator pole-piece associated with the said energizing-coil by which it is energized and having a portion extending into proximity to the said rotor to coact therewith; and a breaker including a rotary-member turning concentrically with the said rotor by which it is driven and also located within the interior of the boundaries of the said energizing-coil to have its sparking tendencies minimized by the magnetic flux created within the boundaries of the said coil, the said breaker being electrically connected to the said energizing-coil to alternately make and break the circuit thereto.

2. An electric impulse-motor including in combination: a normally-stationary energizing-coil; a rotor encircled by and mounted for rotation within the said energizing-coil with its axis of rotation extending substantially-diametrically of the said energizing-coil; a stator pole-piece associated with the said energizing-coil by which it is energized and having a portion extending into proximity to the said rotor to coact therewith; a starting-wheel carried by the said rotor and located within the said energizing-coil; a plurality of contact-plates carried by the said starting-wheel and extending substantially-radially with respect to the axis of rotation of the said rotor; and brush-means engaging the said contact-plates and electrically connected to the said energizing-coil to alternately make and break the circuit thereto.

3. An electric impulse-motor including in combination: a normally-stationary energizing-coil; a rotor encircled by and mounted for rotation within the said energizing-coil with its axis of rotation extending substantially-diametrically of the said energizing-coil; a U-shaped stator pole-piece extending around the exterior of the said energizing-coil and having two pole-salients extending inwardly over the said energizing-coil into proximity to the said rotor to coact therewith; and a breaker operatively associated with the said rotor to be driven thereby and electrically connected to the said energizing-coil to alternately make and break the circuit thereto.

4. An electric impulse-motor including in combination: a normally-stationary energizing-coil; a rotor encircled by and mounted for rotation within the said energizing-coil with its axis of rotation extending substantially-diametrically of the said energizing-coil; a U-shaped stator pole-piece extending around the exterior of the said energizing-coil and having two pole-salients extending inwardly over the said energizing-coil into proximity to the said rotor to coact therewith; a starting-wheel carried by the said rotor concentrically therewith and located within the said energizing-coil, the said starting-wheel having a diameter exceeding the axial thickness of the adjacent portion of the said coil; and a breaker operatively associated with the said rotor to be driven thereby and electrically connected to the said energizing-coil to alternately make and break the circuit thereto.

5. An electric impulse-motor including in combination: a normally-stationary energizing-coil; a rotor encircled by and mounted for rotation within the said energizing-coil with its axis of rotation extending substantially-diametrically of the said energizing-coil; a U-shaped stator pole-piece extending around the exterior of the said energizing-coil and having two pole-salients extending inwardly over the said energizing-coil into proximity to the said rotor to coact therewith; a starting-wheel carried by the said rotor and located within the said energizing-coil; a plurality of contact-plates carried by the said starting-wheel and extending substantially-radially with respect to the axis of rotation of the said rotor; and brush-means engaging the said contact-plates and electrically connected to the said energizing-coil to alternately make and break the circuit thereto.

6. An electric impulse-motor including in combination: a normally-stationary energizing-coil; a rotor encircled by and mounted for rotation within the said energizing-coil with its axis of rotation extending substantially-diametrically of the said energizing-coil; a pair of U-shaped stator pole-pieces respectively located at substantially-diametrically-opposite points with respect to the said energizing-coil and each extending around the exterior thereof, each of the said U-shaped stator pole-pieces having two pole-salients extending inwardly over the said energizing-coil toward the similar pole-salients of the other pole-piece in substantial parallelism therewith and into proximity to the said rotor to coact therewith and being substantially in the plane of the said rotor; and a breaker operatively associated with the said rotor to be driven thereby and electrically connected to the said energizing-coil to alternately make and break the circuit thereto.

7. An electric impulse-motor including in combination: a normally-stationary energizing-coil; a rotor encircled by and mounted for rotation within the said energizing-coil with its axis of rotation extending substantially-diametrically of the said energizing-coil; a pair of U-shaped stator pole-pieces respectively located at substantially-diametrically-opposite points with respect to the said energizing-coil and each extending around the exterior thereof, each of the said U-shaped stator pole-pieces having two pole-salients extending inwardly over the said energizing-coil directly toward the similar pole-salients of the other of said pole-pieces and into proximity to the said rotor to coact therewith and being substantially in the plane of the said rotor; a starting-wheel carried by the said rotor and located within the said energizing-coil and extending in a plane substantially-parallel with the planes of the aforesaid U-shaped pole-pieces; a plurality of contact-plates carried by the said starting-wheel and extending substantially-radially with respect to the axis of rotation of the said rotor; and brush-means engaging the said contact-plates and electrically connected to the said energizing-coil to alternately make and break the circuit thereto.

8. An electric impulse-motor including in combination: a normally-stationary energizing-coil divided into two axially-displaced coil-sections; a rotor encircled by and mounted for rotation within the said energizing-coil with its axis of rotation extending substantially-diametrically of the said energizing-coil; a shaft for the said rotor extending outwardly therefrom through the gap between the coil-sections of the said energizing-coil; a ring-like pole-piece encircling the exterior of the said energizing-coil and having the axis of the aperture extending therethrough arranged at a substantial right angle with respect to the axis of the aperture in the said energizing-coil; and a breaker operatively associated with the said rotor to be driven thereby and electrically connected to the said energizing-coil to alternately make and break the circuit thereto.

9. An electric impulse-motor including in combination: a normally-stationary energizing-coil; a rotor encircled by and mounted for rotation within the said energizing-coil with its axis of rotation extending substantially-diametrically of the said energizing-coil; a ring-like pole-piece encircling the exterior of the said energizing-coil and having the axis of the aperture extending therethrough arranged at a substantial right angle with respect to the axis of the aperture in the said energizing-coil; and a breaker operatively associated with the said rotor to be driven thereby and electrically connected to the said energizing-coil to alternately make and break the circuit thereto.

JOHN J. ROOT.